United States Patent
Hackl et al.

(10) Patent No.: US 9,914,156 B2
(45) Date of Patent: Mar. 13, 2018

(54) METHOD FOR PREPARING AND DETOXIFYING USING LIQUID RINSING MEDIUM

(71) Applicant: EREMA ENGINEERING RECYCLING MASCHINEN UND ANLAGEN GESELLSCHAFT M.B.H., Ansfelden (AT)

(72) Inventors: Manfred Hackl, Linz-Urfahr (AT); Klaus Feichtinger, Linz (AT); Gerhard Wendelin, Linz (AT); George Weigerstorfer, Linz/Ebelsberg (AT); James Donaldson, Yarm (GB)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 30 days.

(21) Appl. No.: 15/080,511

(22) Filed: Mar. 24, 2016

(65) Prior Publication Data

US 2016/0279683 A1    Sep. 29, 2016

Related U.S. Application Data

(62) Division of application No. 13/574,566, filed as application No. PCT/AT2011/000028 on Jan. 17, 2011, now Pat. No. 9,358,547.

(30) Foreign Application Priority Data

Jan. 22, 2010  (AT) .................................. A/88/2010
Feb. 12, 2010  (AT) ................................ A 211/2010

(51) Int. Cl.
*B08B 5/02* (2006.01)
*B29B 17/04* (2006.01)
(Continued)

(52) U.S. Cl.
CPC ................ *B08B 5/02* (2013.01); *B02C 19/00* (2013.01); *B08B 3/00* (2013.01); *B08B 3/10* (2013.01);
(Continued)

(58) Field of Classification Search
CPC .... B08B 3/00; B08B 3/10; B08B 5/02; B29B 2017/0015
See application file for complete search history.

(56) References Cited

U.S. PATENT DOCUMENTS 4,992,222 A * 2/1991 Banevicius ............ C08G 65/46
                                                   159/2.2
5,335,786 A * 8/1994 Roberto .................. B03B 9/061
                                                   209/10
(Continued)

FOREIGN PATENT DOCUMENTS

AT        506403 A4    9/2009
DE     26 09 850 A1    9/1977

*Primary Examiner* — Frances Tischler
(74) *Attorney, Agent, or Firm* — Kilpatrick Townsend & Stockton LLP

(57) ABSTRACT

The present invention concerns a method for processing and detoxification of a material, especially a thermoplastic material, and for removal of contaminants or impurities from this material, wherein the material is heated under vacuum in at least one receiving tank, mixed and possibly comminuted, and wherein a rinsing medium is introduced into the receiving tank beneath the material level, conducted through at least a partial region of the material, and the rinsing medium enriched or saturated with contaminants is brought out from the receiving tank once more. According to the invention, the quantity of rinsing medium introduced into the receiving tank is less than 0.1 liter per hour per kilogram of material or material throughput per hour, while at the same time the vacuum in the receiving tank is kept constantly below 100 mbar.

18 Claims, 3 Drawing Sheets

(51) Int. Cl.
*C08G 85/00* (2006.01)
*C08J 11/06* (2006.01)
*B02C 19/00* (2006.01)
*B08B 3/00* (2006.01)
*B08B 3/10* (2006.01)
*B29B 17/02* (2006.01)
*B29K 23/00* (2006.01)
*B29K 67/00* (2006.01)
*B29K 105/06* (2006.01)
*B29B 17/00* (2006.01)
*B29K 105/26* (2006.01)

(52) U.S. Cl.
CPC ........ *B29B 17/0412* (2013.01); *C08G 85/002* (2013.01); *C08J 11/06* (2013.01); *B29B 17/02* (2013.01); *B29B 2017/001* (2013.01); *B29B 2017/0015* (2013.01); *B29B 2017/0476* (2013.01); *B29K 2023/065* (2013.01); *B29K 2023/12* (2013.01); *B29K 2067/00* (2013.01); *B29K 2067/003* (2013.01); *B29K 2105/065* (2013.01); *B29K 2105/26* (2013.01); *Y02W 30/521* (2015.05); *Y02W 30/622* (2015.05); *Y02W 30/625* (2015.05); *Y02W 30/701* (2015.05)

(56) References Cited

U.S. PATENT DOCUMENTS

2010/0216902 A1   8/2010   Wendelin et al.
2010/0249320 A1   9/2010   Matsumoto et al.

\* cited by examiner

METHOD FOR PREPARING AND DETOXIFYING USING LIQUID RINSING MEDIUM

RELATED APPLICATIONS

This application is a divisional application of U.S. application Ser. No. 13/574,566 filed Jul. 20, 2012, which is a U.S. National Phase under 35 USC 371 of PCT Application No. PCT/AT2011/000028 filed Jan. 17, 2011, which claims priority to Austrian Application No. A 88/2010, filed Jan. 22, 2010, and Austrian Application No. A 211/2010, filed Feb. 12, 2010, the disclosures of which are incorporated by reference herein.

TECHNICAL FIELD OF THE INVENTION

The invention concerns a method for processing and detoxification of a material, especially a thermoplastic material, and for removal of contaminants or impurities from this material, as well as a device to carry out this method.

BACKGROUND

An important requirement especially in the recycling of plastics is that the end products made from the recycled material be of attractive quality and as close as possible to products made from new goods. The sorted or recycled material and the products made from it must fulfil the necessary mechanical requirements and standards and, in particular, not be impaired by noxious odors, colors, or migrating toxins, etc. Especially plastic packages that are intended for use with foodstuffs must meet strict food law rules.

If such materials are taken from the recycling pathways, they must therefore be appropriately cleaned and processed. Besides various cleaning and washing processes, which mainly clean the surfaces, often other cleaning needs to be done, especially since most polymers are not "dense" materials and migrations into the material can occur. These migrations, however, cannot be removed with washing processes acting merely on the surface or exterior.

The second step is the detachment of the contaminants from the surface of the material. The detachment is facilitated by a rinsing medium and is dependent on the ambient pressure, or facilitated by applying a vacuum. An effective detachment can only be achieved with a vacuum under 100 mbar.

In a third step, the elimination, the contaminants must then be transported away by the rinsing medium and removed from the receiving tank.

Thanks to the invention's choice of an appropriately high temperature, the providing of an appropriate vacuum and the introducing of a rinsing medium, a good efficiency of the detoxification can be achieved. Yet still one must consider other factors, especially the economy and the duration of the process.

It is basically permissible to think that one should conduct the largest possible quantities of rinsing medium through the material in order to detach and transport away the presumably large quantity of contaminants. Such methods, in which large quantities of scouring gas are conducted through the material, for drying for example, are also described in the prior art. However, in these methods, usually no vacuum is applied, and instead the methods are carried out in open containers under ambient pressure. But because of the lack of a vacuum, both the diffusion and the detachment of the contaminants is reduced. Hence, a large quantity of rinsing medium by itself is not helpful.

In this context, it should be noted that introducing a rinsing medium—and especially a large quantity of a rinsing medium—into an evacuated container always necessarily entails that the vacuum is greatly impaired or reduced by this. The more rinsing medium is introduced, the higher the pressure and the less the vacuum becomes, and the less migration and evaporation or detachment of contaminants. If a corresponding vacuum is to be maintained, it would no longer be possible to introduce sufficient rinsing medium without reducing the vacuum, so that although more contaminants would be present on the surface, still they would not be detached and thus neither could they be removed.

On the other hand, or to counterbalance this, neither can the vacuum simply be increased at will so as to achieve in this way the greatest possible migration as well as a good detachment of the contaminants. This would require a higher suction power of the vacuum pump, which in turn would entail higher overhead and operating costs. But even with the best vacuum systems, a sufficiently deep vacuum cannot be created with high quantities of rinsing medium.

Therefore, one cannot use a large quantity of rinsing medium to supposedly accomplish a high detachment and a large elimination of the contaminants without also paying heed to the vacuum. In fact, this would even be counterproductive since, as explained, it would either lower the vacuum, which in turn would mean that the detoxification efficiency is reduced on account of the worse diffusion and less detachment, or it would no longer be possible to carry out the process, or not in an economical manner.

Thus, one must balance out the countervailing parameters against each other and bring them into a harmony. In this way, one can then also determine the required dwell time of the material in the receiving tank.

The cleaning action is boosted on average by 5 to 65% as compared to a treatment without rinsing medium. It has been found that contaminants with higher evaporation points experience a greater cleaning boost than contaminants that are easy to evaporate or otherwise fundamentally easy to clean. The obtained products fulfil all required standards, e.g., they comply with ILSI, are FDA certified or certified in compliance with EFSA.

Surprisingly, it has been found in the experiments underlying the invention that, contrary to the former view, no large quantities of rinsing medium are needed and even very small quantities of rinsing medium are sufficient to drastically boost the efficiency of the detoxification. As a result, with further effective detachment of contaminants from the surface, the maintaining of the necessary vacuum becomes substantially easier and more economical. The method thus becomes more economical and the process time is shortened, or the dwell time in the reactor can become shorter.

Further advantageous configurations of the invented method are described in the dependent claims.

Thus, for an efficient diffusion or migration of the contaminants from the interior of the materials to the surface, as well as for a good detachment, it is advantageous to provide that the vacuum is held permanently below 50 mbar, in particular, between 10 and 20 mbar, preferably under 2 mbar.

According to one advantageous configuration of the method, it is possible to uses as the rinsing medium a gaseous substance, especially air, carbon dioxide, steam, an inert gas such as nitrogen. Gaseous rinsing agents can also be used in particular for an additional drying of the materials in the receiving tank. Basically all inert gases are especially useful, since they exert little or no influence on the polymer in the hot environment in the pretreatment tank.

Alternatively, it is also advantageous to use a liquid as the rinsing medium, one that evaporates immediately after entering the receiving tank, especially water. Water in particular produces an especially high efficiency of detoxification and is also more effective than air in very small amounts. Basically, liquid rinsing agents are easier to stockpile and dispense. In particular, their evaporation upon entering the receiving tank brings about a change in the state of aggregation, which helps the detachment of the contaminants from the surfaces of the polymer particles occur even better. Thus, usually at least for a short time, the liquid rinsing medium produces a wetting of the surface of the material particles. Thus, the liquid rinsing medium can loosen the contaminants found on the surface. The contaminants are detached from the surface even more efficiently during the evaporation of the rinsing medium that occurs soon afterwards.

In this context, it is advantageous for the rinsing medium to be polar or apolar. Thus, depending on the nature of the polarity of the contaminants, the most efficient solubility or mixture of the contaminants in the rinsing medium can be achieved.

According to one advantageous process, the rinsing medium is heated and/or dried before entering the receiving tank, e.g., by an upstream heating appliance or a gas drying appliance. The heating is done in energy-saving manner, advantageously from the waste heat of the overall process.

In the case of liquid media, the energy of evaporation is advantageously extracted from the system. For this purpose, the bottom disk, which is usually configured as a cooled disk, can be provided with small nozzles and the energy of evaporation can be used for cooling of the disk.

The type of rinsing agents introduced depends on the nature and quantity of anticipated contaminants, the properties of the material being cleaned, and the stated purpose.

For example, if it is the stated purpose to clean migration products from milk bottles made of high density polyethylene (HD-PE), then in addition to the correct process temperature and the establishing of the necessary vacuum it is advantageous to introduce water or air for the intensified cleaning. Water is sprayed in in small amounts and turns into steam or gas under the process conditions. The use of water is relatively noncritical in the case of HD-PE or other polyolefins, since these polymers react relatively insensitively to water under the given process conditions, especially the elevated temperature.

But if the stated purpose is the cleaning of migration products from polyethylene terephthalate (PET) flakes and if the material properties of PET are to be preserved or even improved, then water is a conceivably unfavorable medium, since water or steam at elevated temperatures can lead to a breakdown of the molecular chain of PET. Air or oxygen can also lead to an oxidative discoloration, which is undesirable. For this reason, one will in this case prefer an inert gas or a liquid having no influence on the polymer. Moreover, ethylene glycol or diethylene glycol is produced during the polycondensation which sometimes occurs. These products are also more easily taken away. Yet a precondition is that the rinsing medium be free of moisture, e.g., dry nitrogen.

Yet there are also stated purposes in which a targeted influencing of the viscosity of PET and at the same time a carrying away of the migration products is desired, e.g., during the recovery of recycled goods in a polymerization process. In this case, a breakdown of the molecular chains is in fact desired and water, for example, proves to be a favorable rinsing medium, since it provides for an accelerated removal of the migration substances, as well as a breakdown of the molecular chains.

The main purpose of the rinsing medium, however, is the detachment of the migration products from the surface of the polymer particles, as well as the subsequent carrying away of the migration products.

According to another advantageous process, the rinsing medium enters the receiving tank or strikes the material being cleaned with a velocity of at least 1 m/min. It has been found that the second step in particular, namely, the detachment of the contaminants from the surface of the materials, is also dependent on the velocity of the flowing medium or the velocity with which the rinsing medium strikes the surface. In this way, the detachment of the contaminants is more or less physically constrained and the contaminants are entrained by the rinsing medium flowing past them. This effect occurs at a limit velocity of the rinsing medium of at least one meter per minute, or in many cases already at 0.8 or 0.9 m/min. Thus, if the rinsing medium strikes a polymer particle being cleaned with such an oncoming velocity or a higher velocity, large amounts of contaminants, already having migrated to the surface of the flakes on account of the temperature, will be carried away and taken up into the flow of rinsing medium.

According to another advantageous process, the quantity of rinsing medium entering the receiving tank in the case of a gaseous rinsing medium is in the range of 0.1 to 4.7 $Nm^3$, (normal cubic meters Vn), preferably 1 to 3 $Nm^3$, per hour per kilogram of material throughput per hour, and in the case of a liquid rinsing medium prior to the evaporation it is in the range of 0.0001 to 0.08 liters, preferably between 0.003 and 0.05 liters, per hour per kilogram of material throughput per hour. As a rule, the partial vacuum ranges from 2 to 20 or 50 mbar. The process can be conducted especially efficiently, quickly and economically in these ranges.

According to another advantageous process, the quantity of rinsing medium entering the receiving tank in the case of a gaseous rinsing medium is <0.050 $Nm^3$, preferably in the range of 0.001 to 0.047 $Nm^3$ (normal cubic meters Vn), preferably 0.001 to 0.030 $Nm^3$ per hour per kilogram of material throughput per hour, and in the case of a liquid rinsing medium prior to the evaporation it is in the range of 0.0001 to 0.08 liters, preferably between 0.003 and 0.05 liters, per hour per kilogram of material throughput per hour. As a rule, the partial vacuum ranges from 2 to 20 or 50 mbar. The process can be conducted especially efficiently, quickly and economically in these ranges.

The method of the invention preferably runs continuously, the material being detoxified is introduced continuously into the receiving tank and after a certain dwell time it is taken out once more, e.g., to a delivery worm, an extruder, or another treatment tank, and the rinsing medium also flows in and is taken away continuously.

It is especially efficient for the rinsing medium to be introduced through the bottom surface of the receiving tank, especially a cylindrical one.

Due to the fact that the flakes in the receiving tank are swirled around in a rotating mixing vortex, the materials often sweep past the inlet opening for the rinsing medium. It is advantageous for the inlet opening to be relatively small. Thus, the materials at this site will be locally struck by the rinsing medium and the contaminants will be detached and taken up into the gas flow. After this, the particle moves onward and the next particle gets into the inflow region of the rinsing medium stream. In this way, a large amount of particles in a given time moves past that site or that stippled inlet region where the velocity or local flow of rinsing medium is more than 1 m/min. Whether the velocity is reduced in other regions of the tank, further removed from the inlet nozzle, is then a secondary concern, since the detachment has already taken place.

A preferred variant, especially for making sure to reach the necessary minimum velocity of the rinsing medium, is characterized in that the rinsing medium is introduced by at least one nozzle, if necessary a single nozzle, such as a needle nozzle, preferably with a diameter of 1 to 3 mm. The open area of the nozzle is advantageously less than or equal to 70 mm$^2$.

Oftentimes baffle plates are placed in front of the inlet openings to prevent clogging. This is neither necessary nor advantageous in the present case, as it would prevent a direct and immediate striking of the particles by the rinsing medium. Thus, the inlet openings for the rinsing medium in the receiving tank should be as uncovered as possible and free of covers that deflect the rinsing stream or lower its velocity.

Especially when processing polymer materials it is advantageous for the flakes to remain single and loose, since only this will ensure a large overall surface of material. For this reason, it is advantageous when processing a polymer material for the treatment to occur at a temperature above the glass transition temperature and below the melting range, preferably at a temperature at which the material exists in a softened state, preferably in the region of the VICAT softening point (per DIN 306, A, 10N, 50 K/h). The flakes softened and sticky in this way are kept single and free flowing by the constant movement and blending, and a baking into a compact cake with small surface is prevented.

According to one advantageous process control, it is possible to add at least one other receiving tank or pretreatment tank upstream or downstream from the receiving tank, and to have the material run through all receiving tanks in succession. The method of the invention is preferably carried out in each of the receiving tanks, and the process control can also be varied. By appropriate choice of the parameters, adapted to the material and the anticipated contaminants, and in order to achieve an even better efficiency of the detoxification, different kinds and/or different quantities of rinsing agents can be used in the tanks. Thus, for example, for a complete removal of several contaminants at the same time, it is advantageous to use different polar rinsing agents in the receiving tanks, e.g., a polar rinsing medium in the pretreatment tank and an apolar rinsing medium in the main treatment tank, or vice versa. An advantageous device for this is described, for example, in WO 03/103915. This device, as presented in the figures and the specification of WO 03/103915, is included in the present application by reference.

In this context, it is especially advantageous to provide a pretreatment tank and a main treatment tank connected to it, while the method according to one of the preceding claims is carried out in each of the two tanks. An especially effective detoxification is achieved when the temperature in the main treatment tank is greater than that in the pretreatment tank and/or the pressure in the main treatment tank is less than that in the pretreatment tank.

Moreover, according to the invention, there is specified, or the problem is solved by a special device, in which the gas feeding means is configured such that the rinsing medium can be introduced into the receiving tank with a velocity of at least 1 m/min and the receiving tank and the vacuum pump are configured or structurally designed so that a vacuum can be maintained in the receiving tank constantly below 100 mbar. The method of the invention can be carried out quickly and easily with such a device.

The device of the invention is essentially based on a commercial device, such as is available, for example, under the name Vacurema® Basic, Advanced or Prime from the firm Erema. For example, one can use a device as specified in EP 2 117 796. The device presented in EP 2 117 796 and specifically described in the specification is taken up by reference into the contents of the present application.

In the method of the invention, the rinsing medium that is capable of detaching the contaminants, taking them up or carrying them along, is introduced from below, i.e., in a region below the level of the material located in the cutter-compactor in operation or below the level of material of the mixing vortex forming inside the cutter-compactor. The rinsing medium enriched or possibly saturated with contaminants, and then gaseous, is brought out from the cutter-compactor in a region above the level of the material located in the cutter-compactor during operation or above the material level of the mixing vortex. A forced flow is formed in this way and the rinsing medium flows through at least one subregion of the material.

The feeding means for the rinsing medium can be configured as a passive feeding means, for example, as mere through openings, through which the gas is sucked in purely passive manner into the inside of the cutter-compactor, such as by virtue of the partial vacuum. But the feeding means can also be configured as active feeding means, such as nozzles or the like, through which the gas can be actively blown, sprayed or pumped into the inside of the receiving tank, for example, with pumps, blowers, etc., using excess pressure.

The feeding means, on the one hand, can be configured in particular in the form of one or more nozzles in the bottom surface of the cutter-compactor, beneath the lowermost bottom mixing element, and preferably inside the innermost radius third of the bottom surface. If the feeding means are configured in the bottom surface, the blowing in of the rinsing medium from below also brings about a certain loosening of the sump, which ensures an even better treatment and detoxification of the material.

The feeding means can be configured as individual single openings or in the form of an annular slot opening running almost continuously around the bottom surface in order to lead through the drive shaft of the mixing element.

Alternatively or additionally to the openings in the bottom surface, the feeding means can also be arranged in the side wall of the cutter-compactor, making sure that the feeding means are always below the material level. Advantageous are positions of the feeding means in the area of the lowermost third of the overall height of the cutter-compactor, especially below the lower or lowermost mixing elements near the bottom.

In devices with several mixing elements arranged one above the other, it is advantageous for the process control to arrange the feeding means between the uppermost and the lowermost mixing elements and have them empty into the space formed between every two disks or mixing elements. In this way, the material is well exposed to the flow of rinsing medium and the flow advantageously works together with the mixing by the mixing elements.

Advantageously, the feeding means do not empty in the region of the edges of the support disks or the mixing elements, but rather in particular in the region between every two support disks or mixing elements in the receiving tank, or they are arranged there, while the feeding means are arranged in particular in the middle between every two support disks or mixing elements.

In this context, it is especially advantageous to have breakthroughs, at least in the upper support disk, since in this way the contaminants can be effectively removed from the region between the mixing elements.

If the feeding means are configured in that region of the side wall of the tank in which the rotating material particles exert the greatest pressure on the side wall, the feeding means must counteract this pressure and bring the rinsing medium by pressure into the interior of the tank as active feeding means.

The gas feeding means can also be configured as individual single openings in the side wall. But they can also be configured in the form of an annular gap extending along the circumference.

Alternatively or additionally to the possible arrangements described thus far, the feeding means can also be arranged on at least one of the mixing elements or on the support disk. An arrangement on the lower mixing element, closest to the bottom surface, or on the lower support disk is advantageous; when the feeding means is arranged on the mixing elements or support disks, it is advantageous to configure the feeding means on the side facing the bottom surface.

Furthermore, it is advantageous to arrange the feeding means close to the axis of the support disk or the mixing elements and advantageously close to the edges of the mixing elements following on behind the support disk as it revolves or close to the breakthrough. In this way, an effective removal of the contaminants can be assured.

A flowing of rinsing agents through the material in a cross current, i.e., from side wall to side wall, is likewise possible, but somewhat more expensive. However, it is advantageous when a possible recondensation needs to be prevented. In theory, a feeding of the rinsing agents from above is also possible.

To regulate the feeding and removal, the feeding means are advantageously at least partly movable and controllable. An actuating element or valve advantageously controls the quantity of rinsing agents. The actuating element can be controlled via a metering of the vacuum. This is advantageous, because the vacuum needs to be maintained in order to have an adequate diffusion gradient.

It has been shown in experiments that the cleaning effect can be boosted and the process time shortened when rinsing agents are introduced into a vacuum-tight receiving tank according to the invention. It is important that the agents also in fact flow through the material and at the same time the vacuum is further maintained.

The invention will now be described by means of especially advantageous sample embodiments, not to be taken as limitations.

BRIEF DESCRIPTION OF THE DRAWINGS

Especially preferred devices in which the following process examples were also carried out are presented in the drawings.

DETAILED DESCRIPTION

Figure 1:
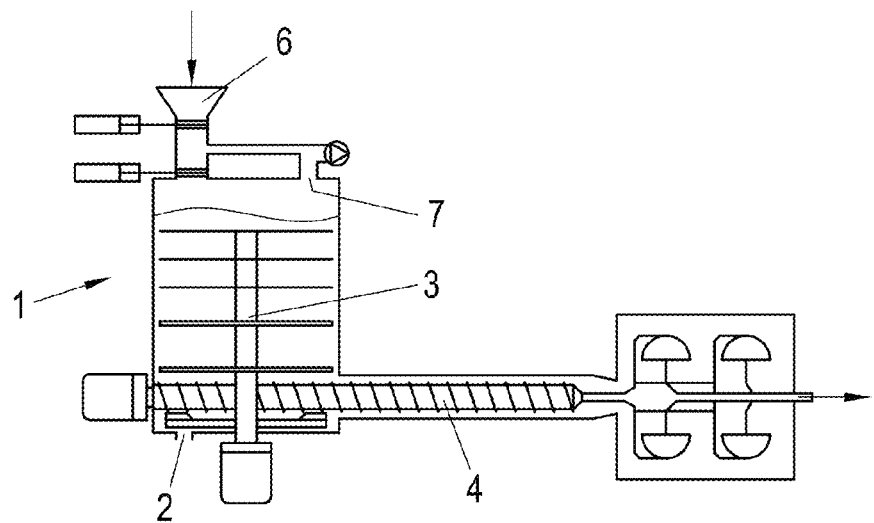
FIG. 1 shows a single-stage device

FIG. 1 shows a single-stage device whose design is borrowed from a Vacurema® Basic layout, with the difference that a feed opening 2 for the rinsing medium has been fashioned. The device consists of a receiving tank or vacuum reactor or cutter-compactor 1, which can be evacuated with a vacuum pump, being connected in the lowermost region to a single-worm extruder 4. The contaminated flakes being recycled arrive by a vacuum sluice 6 from above in the receiving tank 1, are heated, softened, but not melted by a mixing and agitating element 3 driven in rotation on a vertical axis, constantly moved, mixed and comminuted. At the same time, a scouring gas is introduced from below through a feeding opening 2 located in the bottom, conducted through the material or the mixing vortex, and taken out once more at the top through the suction opening 7. Thus, the method of the invention takes place in the receiving tank 1, achieving a decontamination, with simultaneous drying, crystallization, and raising of the intrinsic viscosity. After an appropriate dwell time, the material is force fed into the intake zone of the extruder 4 while maintaining the vacuum, where it is melted, and then filtered and further processed.

Figure 2:
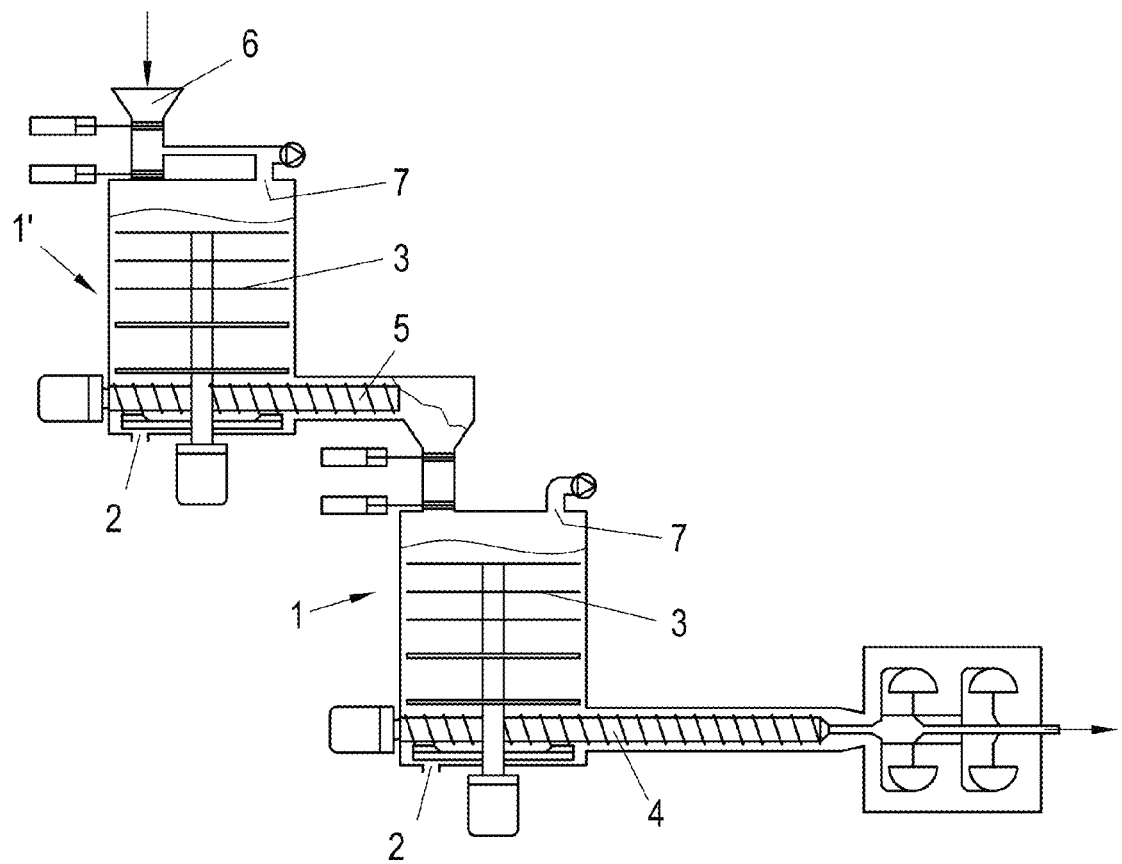
FIG. 2 shows a two-stage device with a pretreatment tank

FIG. 2 shows a layout whose design is borrowed from a Vacurema® Advanced layout. Here, there are two receiving tanks 1, 1'—configured the same as the tank in FIG. 1—or an evacuable pretreatment tank 1' is connected upstream from the evacuable main treatment tank 1, in which the raw material being cleaned and recycled is first introduced and treated by the method of the invention. After an appropriate dwell time, the material is taken from the pretreatment tank 1' by a noncompressing exit worm 5 under vacuum to the main treatment tank 1, where it again undergoes the processing of the invention, especially under altered conditions yet still conforming to the invention, and it is then finished similarly to FIG. 1.

Figure 3:
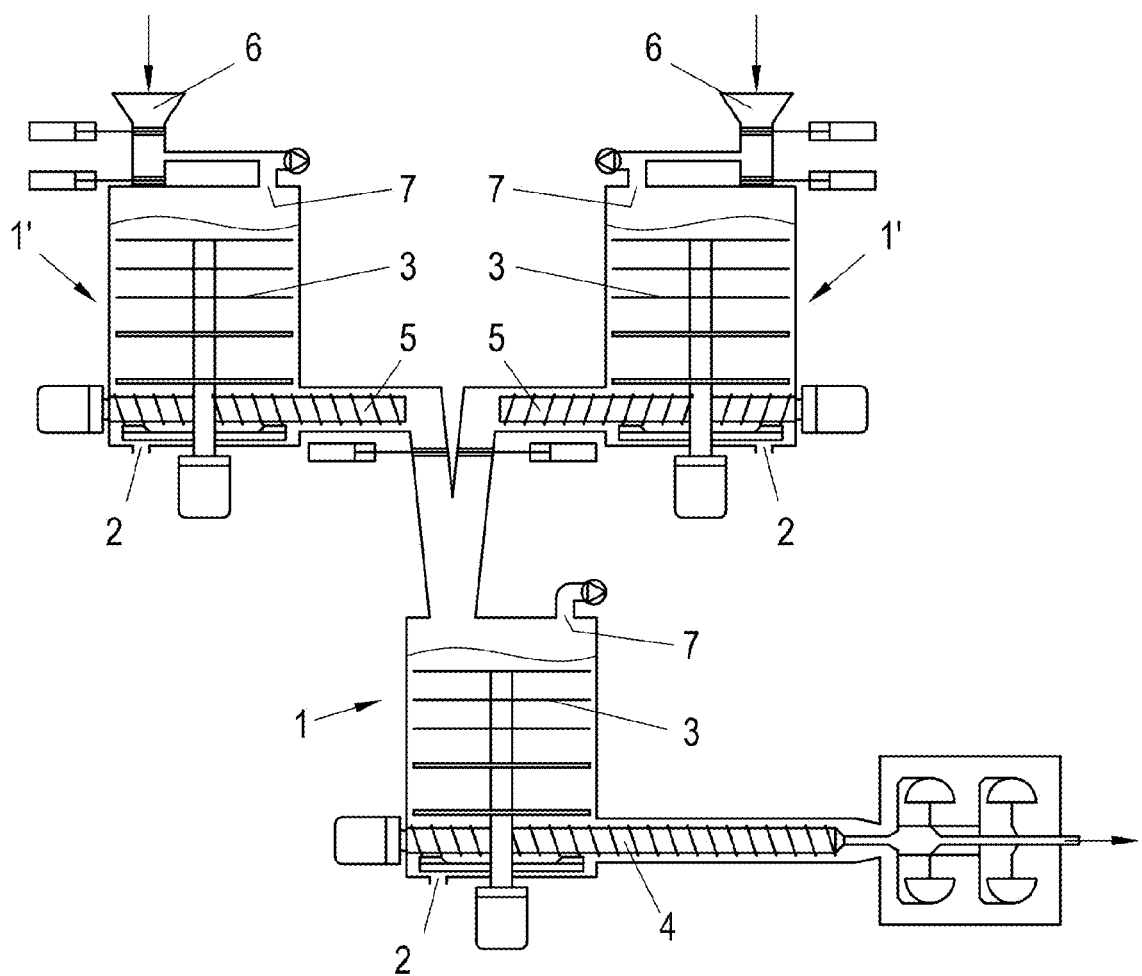
FIG. 3 shows a two-stage device with two pretreatment tanks

FIG. 3 shows a layout whose design is borrowed from a Vacurema® Prime layout. Here, there are three receiving tanks 1, 1'—configured the same as the tank in FIG. 1—namely, an evacuable main treatment tank and two pretreatment tanks 1' connected upstream from the main treatment tank. The two pretreatment tanks 1' are switched in parallel with each other and are operated alongside each other or alternating and discontinuously in batch operation and the alternately and thus continuously charge the downstream main treatment tank 1. All three tanks 1, 1' are configured or provided with a feeding opening 2 for the rinsing medium so that the method of the invention can be carried out in each of the tanks 1, 1', possibly with different parameters.

Alternatively, it can be provided that no scouring gas is introduced or can be introduced in the pretreatment tanks 1' of FIGS. 2 and 3 and that they are operated in traditional manner. In the main treatment tank 1, however, the introducing of the scouring gas according to the method of the invention occurs in every case.

The following process examples were carried out with the devices described here.

Example 1

Cleaning of HD-PE Milk Bottles in a Single-Stage Process Vacurema® Basic

The following effects were achieved in the processing of HD-PE flakes from milk bottles that were first washed in a conventional washing plant with an adapted single-stage Vacurema® Basic layout:

If one has, for example, an operating point of $T_{polymer}=115°$ C., pressure p in the tank=10 mbar, dwell time=60 min and a cleaning efficiency of around 92.3% for certain marker chemicals like toluene or chloroform, the cleaning efficiency is increased to 98.2% when a rinsing medium, namely, 0.003 liters of water per hour per kg of material per hour is introduced (the material throughput was around 300 to 350 kg of PH per hour), which evaporates in the tank. The vacuum is reduced to around 20 to 25 mbar in this process, but it is still adequate.

Example 2

Cleaning of HD-PE Milk Bottles in a Two-Stage Process Vacurema® Advanced

HD-PE milk bottles that were first washed in a conventional washing plant are processed in an adapted Vacurema® Advanced System (FIG. 2) and freed from toxins that had diffused into them. The device consists of a pretreatment tank 1' and a downstream connected main treatment tank 1. Both tanks 1, 1' are operated under a vacuum and can be subjected to scouring gas.

In the pretreatment tank 1', the rough cleaned and ground-up HD-PE flakes in the cold, dry state are continuously introduced (material throughput 1000 kg/h) in small batches through a sluice 6. Under continual stirring, the flakes are mechanically heated under vacuum. The temperature is held below or near the Vicat temperature in order to prevent a sticking or agglomeration of the flakes. The flakes behave as a fluid in the pretreatment tank 1' and move through the tank under continual agitation, the mean dwell time being 50 minutes, and a temperature of around 90 to 115° C. is achieved in the lower region of the tank. At the same time, a vacuum of around 1 to 30 mbar is maintained. Under optimal conditions, especially minimal residual moisture etc., the vacuum can at times drop even below 1 mbar.

Now, the goal in this first tank 1' is to remove the toxins having diffused into the flakes at least from the regions of the flakes near the surface.

For this purpose, a quantity of around 0.01 to 0.03 liters of water per hour per kg of material per hour is sprayed in with a flow rate of around 2 m/min by a needle nozzle 2 in the lower region of the tank, which evaporates at once and is carried by the moving material in the counterflow principle. The suctioning off point is located in the roof of the tank. The evaporation of the water in the tank results in a sharp rise in volume. The vacuum is reduced to around 10 to 30 mbar.

The material is then taken to the main treatment tank 1 by sluices or conveyor means 5. Here, a further treatment occurs under different conditions.

In detail, the following conditions occur in the two tanks:
Pretreatment tank:

$T_{material}$=101° C.

$p$=29 mbar rinsing medium: water in a quantity of 0.021/h per material throughput in kg/h
flow velocity: around 2 m/min
Main treatment tank (reactor):

$T_{material}$=123° C.

$p$=3 mbar rinsing medium: air in a quantity of 0.0033 $Nm^3$ per material throughput in kg/h, corresponding for a material throughput of 1000 kg of PE per hour to a quantity of 3.36 $Nm^3$ of scouring air per hour or 1650 $m^3$/h under the aforementioned conditions.
flow velocity: around 2 m/min
The cleaning effect for certain marker chemicals such as toluene and chlorobenzene increases thanks to the method of the invention for toluene from 94.5% (without rinsing medium) to 99.8% and for chlorobenzene from 93.7% to 99.8%.

Example 3

Air-Water Comparison
Here, the air in the main treatment tank 1 in example 2 was replaced by water as the rinsing medium, whereupon the conditions in the main treatment tank 1 changed as follows:
Main treatment tank (reactor):

$T_{material}$=124° C.

$p$=5 mbar rinsing medium: water in a quantity of 0.0032 l/h per material throughput in kg/h, corresponding to around 1.800 $m^3$ of steam per hour per material throughput in kh/h under the aforementioned conditions
flow velocity: around 2 m/min
It was no longer possible to detect the chemicals toluene and chlorobenzene in the material. They had fallen below the limits of detection.

Example 4

Cleaning of Polypropylene Bottles
The PP bottles were treated similar to example 2 under the following conditions:
Pretreatment tank:

$T_{material}$=122° C.

$p$=35 mbar rinsing medium: water in a quantity of 0.028 l/h per material throughput in kg/h, corresponding to around 2.640 $m^3$ of steam per hour per material throughput in kh/h under the aforementioned conditions
flow velocity: around 2 m/min
Main treatment tank (reactor):

$T_{material}$=135° C.

$p$=3 mbar rinsing medium: water in a quantity of 0.0012 l/h per material throughput in kg/h, corresponding to around 1.900 $m^3$ of steam per hour per material throughput in kh/h under the aforementioned conditions (=1900 $m^3$ of steam per hour per 1000 kg of PP/h)
flow velocity: around 2 m/min
The limonene content was analyzed before and after the cleaning step. The initial values in the uncleaned PP flakes were in the range of around 32544 to 46800 detector counts of a headspace detection system. Without the use of rinsing agents, a detection of around 5200 to 8900 counts was found. With the use of rinsing agents according to the invention, the values in the treated material were reduced to 1250 to 1500 counts.

Example 5

Cleaning of HD-PE Milk Bottles
The method was carried out according to example 2, but with a dwell time of 60 minutes in both the pretreatment and the main treatment tanks. HD-PE flakes contaminated with limonene were used. In a long-term experiment, 3000 samples were taken continuously in order to monitor the course of the decontamination.

At first (up to sample 200), the flakes were treated without rinsing agents, only under vacuum, whereupon the average limonene content receded to around 1.2 ppm and fluctuated there.

After this, with otherwise unchanged conditions, rinsing agents were added, namely, by a combined use of water in the pretreatment tank 1' and air in the main treatment tank 2. From sample 200 onward, the rinsing agents were added to both tanks, under the following conditions:

Pretreatment tank:

$T_{material}$=104° C.

$p$=22 mbar rinsing medium: water in a quantity of 0.045 l/h per material throughput in kg/h corresponding for a material throughput of around 1000 kg of PE per hour to a quantity of around 43 m³/min of scouring gas (steam) under the aforementioned conditions.

flow velocity: around 2 m/min
Main treatment tank (reactor):

$T_{material}$=121° C.

Figure 4:
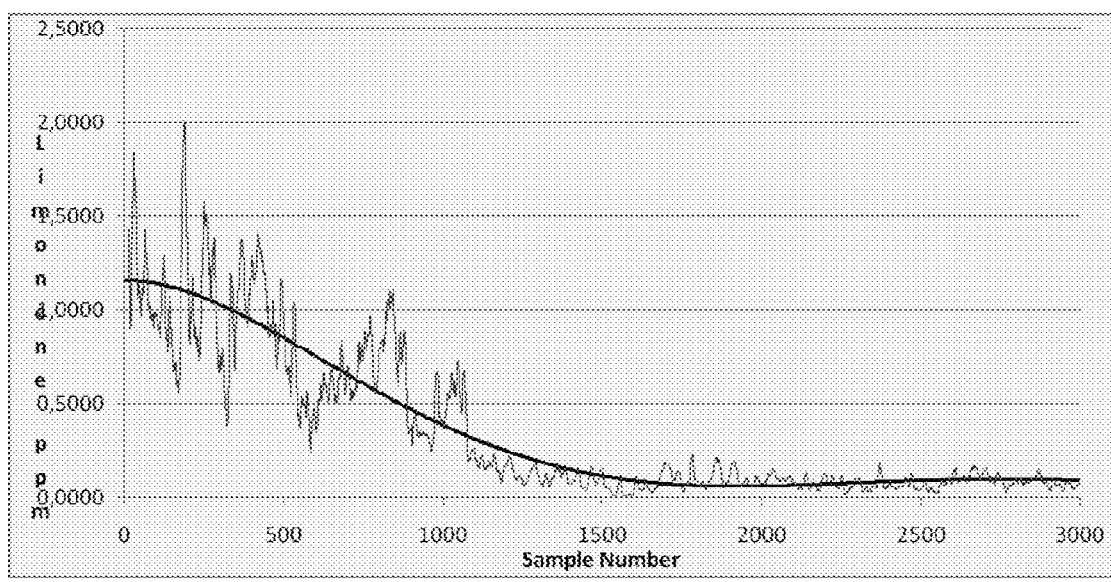
FIG. 4 shows the average limonene content as a result of the experiment.

$p$=5 mbar rinsing medium: air in a quantity of 2.3 m³ hour per material throughput in kg/h under the aforementioned conditions, corresponding for a throughput of 1000 kg of PE per hour to a quantity of 2300 m³ of scouring air per hour under the aforementioned conditions (around 7.86 Nm³/h).

flow velocity: around 2 m/min
The average limonene content as a result receded to around 0.25 ppm and fluctuated there. The course of the experiment can be seen from FIG. 4.

The invention claimed is:

1. A method for processing and detoxification of a thermoplastic material, and for removal of contaminants or impurities from the material, wherein the material is heated under vacuum in at least one receiving tank, mixed and comminuted, and wherein a liquid rinsing medium is introduced into the receiving tank comprising the material from only beneath the material level, conducted through at least a partial region of the material, the liquid rinsing medium evaporates after being conducted through at least the partial region of the material, and the evaporated liquid rinsing medium enriched or saturated with contaminants is brought out from the receiving tank, wherein the quantity of rinsing medium introduced into the receiving tank is less than 0.1 liter per hour per kilogram of polymer material throughput per hour, while at the same time the vacuum in the receiving tank is kept constantly below 100 mbar.

2. The method according to claim 1, characterized in that the vacuum is held permanently below 50 mbar.

3. The method according to claim 1, wherein the liquid rising medium includes water.

4. The method according to claim 1, wherein the liquid rinsing medium is polar or apolar.

5. The method according to claim 1, wherein the liquid rinsing medium is heated before entering the receiving tank.

6. The method according to claim 1, wherein the liquid rinsing medium enters the receiving tank or strikes the material being cleaned with a velocity of at least 1 m/min.

7. The method according to claim 1, wherein the quantity of liquid rinsing medium entering the receiving tank prior to the evaporation is in the range of 0.0001 to 0.08 liters per hour per kilogram of material throughput per hour.

8. The method according to claim 1, wherein the throughput, or the adding of the material and the liquid rinsing medium to the receiving tank and the removal therefrom, is continuous.

9. The method according to claim 1, wherein the liquid rinsing medium is introduced through the bottom surface of the receiving tank.

10. The method according to claim 1, wherein the liquid rinsing medium is introduced by at least one nozzle.

11. The method according to claim 1, wherein the processing, the detoxification or the removal of contaminants or impurities occurs at a temperature above the glass transition temperature and below the melting range of the material.

12. The method according to claim 1, wherein at least one other receiving tank is added upstream or downstream from the receiving tank, and the material runs through the receiving tanks in succession, the method further comprising:
heating the material under vacuum in the other receiving tank, mixing the material in the other receiving tank, and optionally comminuting the material in the other receiving tank; and
introducing an additional rinsing medium into the other receiving tank beneath a level of the material in the other receiving tank, conducting the additional rinsing medium through at least a partial region of the material in the other receiving tank, and bringing out the rinsing medium, enriched or saturated with contaminants, from the other receiving tank.

13. The method according to claim 12, wherein one or more pretreatment tanks switched in parallel are further provided, wherein the receiving tank is a main treatment tank connected to the pretreatment tanks, the method further comprising:
heating the material under vacuum in the pretreatment tanks, mixing the material in the pretreatment tanks, and optionally comminuting the material in the pretreatment tanks; and
introducing an additional rinsing medium into the pretreatment tanks beneath a level of the material in the pretreatment tanks, conducting the additional rinsing medium through at least a partial region of the material in the pretreatment tanks, and bringing out the rinsing medium, enriched or saturated with contaminants, from the pretreatment tanks.

14. The method according to claim 1, wherein the quantity of the rinsing medium introduced into the receiving tank is selected from the group consisting of: in the range of 0.0001 to 0.08 liters, and between 0.003 and 0.05 liters, per hour per kilogram of material throughput per hour.

15. The method according to claim 1, wherein the vacuum is held permanently between 10 and 20 mbar.

16. The method according to claim 1, wherein the vacuum is held permanently under 2 mbar.

17. The method according to claim 1, wherein the quantity of liquid rinsing medium entering the receiving tank prior to the evaporation is in the range of between 0.003 and 0.05 liters per hour per kilogram of material throughput per hour.

18. The method according to claim 1, wherein the processing, the detoxification or the removal of contaminants or impurities occurs at a temperature at which the material exists in a softened state.

* * * * *